US012656122B2

(12) United States Patent
Omr et al.

(10) Patent No.: US 12,656,122 B2
(45) Date of Patent: Jun. 16, 2026

(54) METHOD AND SYSTEM FOR RADAR-BASED ODOMETRY

(71) Applicant: INVENSENSE, INC., San Jose, CA (US)

(72) Inventors: Medhat Omr, Calgary (CA); Jacques Georgy, Calgary (CA); Billy Cheuk Wai Chan, Calgary (CA)

( * ) Notice: Subject to any disclaimer, the term of this patent is extended or adjusted under 35 U.S.C. 154(b) by 406 days.

(21) Appl. No.: 17/403,787

(22) Filed: Aug. 16, 2021

(65) Prior Publication Data

US 2022/0049961 A1     Feb. 17, 2022

Related U.S. Application Data

(60) Provisional application No. 63/066,134, filed on Aug. 14, 2020.

(51) Int. Cl.
| | |
|---|---|
| *G01C 21/16* | (2006.01) |
| *G01S 13/62* | (2006.01) |
| *G06N 3/02* | (2006.01) |

(52) U.S. Cl.
CPC .......... *G01C 21/1652* (2020.08); *G01S 13/62* (2013.01); *G06N 3/02* (2013.01)

(58) Field of Classification Search
CPC ...... G01C 21/1652; G01S 13/62; G06N 3/02; G05D 1/0253
See application file for complete search history.

(56) References Cited

U.S. PATENT DOCUMENTS

| | | | | |
|---|---|---|---|---|
| 9,940,729 | B1 * | 4/2018 | Kwant | .................. G06V 20/56 |
| 10,755,691 | B1 * | 8/2020 | Herman | .......... G10K 11/17853 |
| 2019/0025858 | A1 * | 1/2019 | Bar-Nahum | ......... G08G 5/0069 |
| 2020/0003886 | A1 * | 1/2020 | Cho | ...................... G01S 13/588 |
| 2020/0158862 | A1 * | 5/2020 | Mahmoud | ............. G01S 13/931 |
| 2020/0240790 | A1 * | 7/2020 | Behrendt | .............. G01S 13/865 |
| 2021/0063200 | A1 * | 3/2021 | Kroepfl | .............. G01C 21/3841 |
| 2021/0141092 | A1 * | 5/2021 | Chen | ...................... G01S 13/867 |
| 2021/0237774 | A1 * | 8/2021 | Tang | ....................... G06T 7/248 |
| 2022/0291387 | A1 * | 9/2022 | Pacala | ................... G01S 7/4817 |
| 2022/0299593 | A1 * | 9/2022 | Abir | ...................... G01S 5/0284 |

OTHER PUBLICATIONS

Dan Barnes et al., Masking by Moving: Learning Distraction-Free Radar Odometry from Pose Information, Sep. 9, 2019, Applied AI Lab, University of Oxford, ch. 1, 3-4.1 (Year: 2019).*
Dan Barnes et al: "Masking by Moving: Learning Distraction-Free Radar Odometry from Pose Information", Cornell University Library Ithaca, NY Sep. 9, 2019.
Yasin Almalioglu et al: "Milli-RIO: Ego-Notion Estimation with Millimetre-Wave Radar and Inertial Measurement Unit Sensor", Cornell University Library Ithaca, NY Sep. 12, 2019.

* cited by examiner

*Primary Examiner* — Vladimir Magloire
*Assistant Examiner* — Eric K Hodac

(57) ABSTRACT

An odometry solution for a device within a moving platform is provided using a deep neural network. Radar measurements may be obtained, such that static objects are detected based at least in part on the obtained radar measurements. Odometry information for the platform is estimated based at least in part on the detected static objects and the obtained radar measurements.

19 Claims, 5 Drawing Sheets

METHOD AND SYSTEM FOR RADAR-BASED ODOMETRY

CROSS-REFERENCE TO RELATED APPLICATIONS

This application claims priority from and benefit of U.S. Provisional Patent Application Ser. No. 63/066,134, filed Aug. 14, 2020, which is entitled "Method and System for Odometry Using Radar and Motion Sensors," is assigned to the assignee hereof, and is incorporated by reference in its entirety.

FIELD OF THE PRESENT DISCLOSURE

This disclosure generally relates to positioning and navigation n techniques and more specifically to providing odometry information from radar.

BACKGROUND

Self-driving vehicles have the potential of reducing the number of annual causalities by eliminating the human error factor. By enabling self-driving vehicles, numerous intelligent transportation systems can be deployed and used for traffic management and a multitude of safety and entertainment applications. One of the major challenges facing researchers and engineers working on the development of autonomous vehicles, is fulfilling the system requirement of estimating the vehicles' pose or positioning in real-time within certain accuracy and availability constraints. Traditional systems used for such estimation include Inertial Measurement Units (IMU) and Global Navigation Satellite System (GNSS). IMU-based systems provide relative pose estimation accurate over short time periods but due to the process of mechanization, standalone IMU-based systems, such as inertial navigation systems (INS), accumulate errors in the states exponentially with time due to drift and other sensor characteristics. On the other hand, the position estimated by the GNSS receiver is absolute and does not drift over time. However, GNSS signals are sometimes completely blocked or affected by severe multipath. Due to the complementary error characteristics of motion sensors and GNSS systems, a traditional approach to accurately estimate the pose of the vehicle, is by using sensor fusion algorithms to integrate IMU and GNSS signals. The performance of the GNSS system can also be enhanced by using Differential GPS stations that can broadcast ionospheric and tropospheric errors to adjacent GNSS receivers.

Due to very high accuracy and reliability requirements imposed by autonomous driving applications, traditional IMU/GNSS or INS/GNSS integration is not enough. In dense urban areas, skyscrapers block several positioning satellites and reflect signals (i.e., multipath) from visible and non-visible satellites, leading to low positioning accuracy. Moreover, due to the geometry of the visible satellites, which are mostly collinear in dense urban areas, the GNSS positioning accuracy and availability is usually limited. Hence, traditional IMU/GNSS or INS/GNSS integration systems are not capable of achieving the accuracy requirements for autonomous driving applications in such environments. Regardless of the environment surrounding self-driving vehicles, achieving a minimum level of positioning accuracy is needed. Correspondingly, suitable techniques for providing an additional source of information that may be used in determining a positional and/or navigational solution using radar information are disclosed in the U.S. patent application Ser. No. 16/420,143 referenced above, wherein radar measurements are integrated with information from an IMU to help overcome the limitations of the conventional GNSS integration.

The positioning techniques noted above may benefit from knowledge of odometry for a vehicle or other platform. As used herein, odometry refers to any suitable estimation of a change in position over time. Conventional inertial motion sensors, such as an accelerometer, can provide this information but typically suffer from rapid degradation in accuracy due to the necessity of integrating the measured accelerations. Correspondingly, it would be desirable to provide an odometry solution for a device within a moving platform using other techniques that do not suffer from interruptions in GNSS availability or the drift and errors of inertial motion sensors. It would also be desirable to provide odometry information without requiring previous knowledge about the environment surrounding the vehicle, such as a map or model. As will be described in the following materials, this disclosure satisfies these and other needs.

SUMMARY

This disclosure includes a method for providing an odometry solution for a device within a moving platform using a deep neural network. The method may involve obtaining radar measurements, detecting static objects based at least in part on the obtained radar measurements and estimating odometry information for the platform based at least in part on the detected static objects and the obtained radar measurements.

This disclosure also includes a system for providing an odometry solution for a device within a moving platform using a deep neural network. The system includes at least one radar configured to output radar measurements and at least one processor, coupled to receive the radar measurements and operative to detect static objects based at least in part on the radar measurements and estimate odometry information for the platform based at least in part on the detected static objects and the radar measurements.

DETAILED DESCRIPTION

Figure 1:
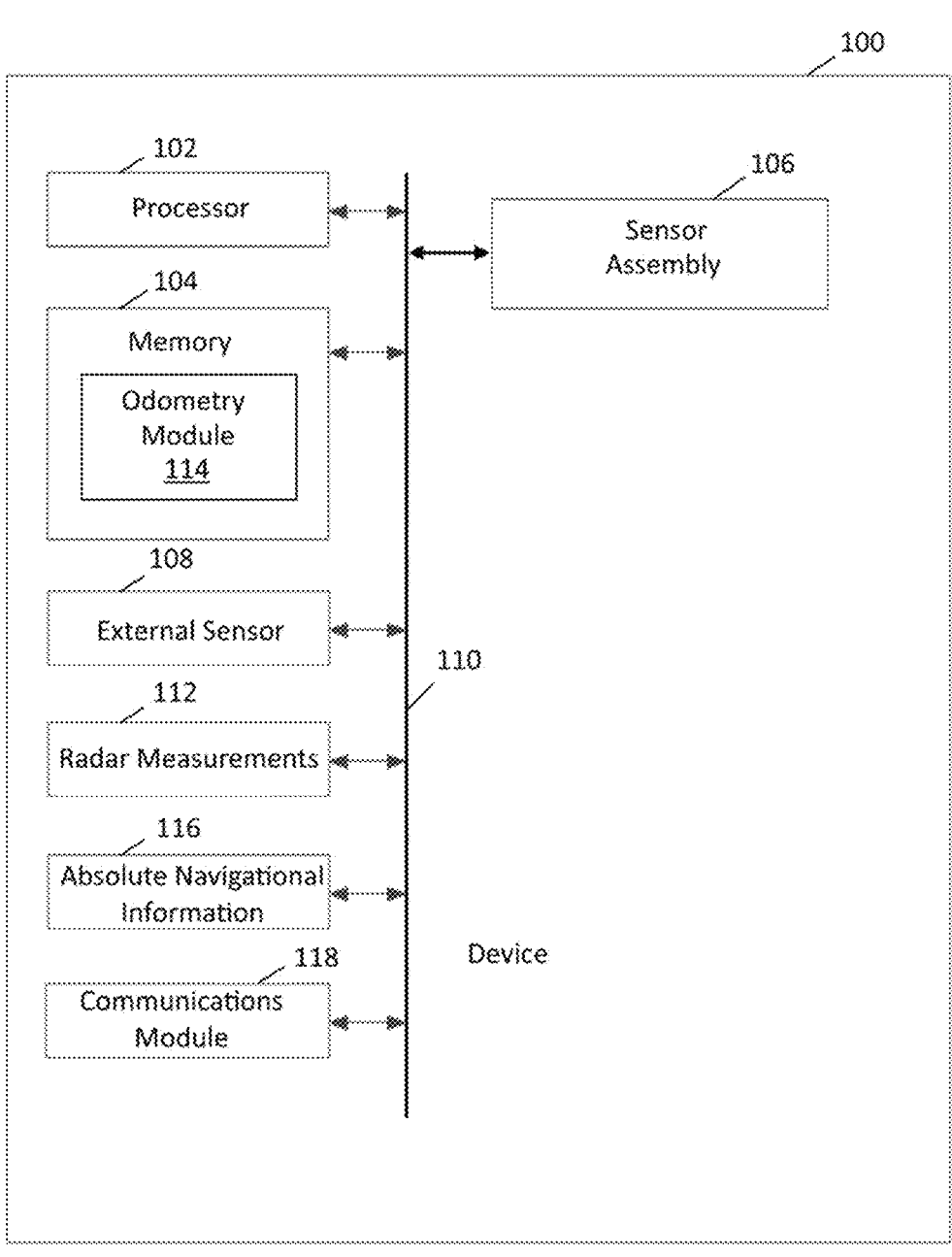
FIG. 1 is schematic diagram of a device for providing an odometry solution for a device within a moving platform using a deep neural network to process radar measurements according to an embodiment.

At the outset, it is to be understood that this disclosure is not limited to particularly exemplified materials, architectures, routines, methods, or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processes and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or electromagnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), complex programmable logic device (CPLD), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration. Moreover, implementation of the neural networks discussed herein may benefit from usage of neural engines, such as the A-series chips of Apple® Computer of Cupertino, CA and the Tensor chips of Google of Mountain View, CA, and/or graphic processing units (GPUs).Unless defined otherwise, all technical and scientific terms used herein have the same meaning as commonly understood by one having ordinary skill in the art to which the disclosure pertains.

Finally, as used in this specification and the appended claims, the singular forms "a", "an" and "the" include plural referents unless the content clearly dictates otherwise.

The techniques of this disclosure are directed to providing an odometry solution for a device within a moving platform by detecting static objects with radar measurements. Beneficially, the techniques of this disclosure do not require any previous knowledge of the environment surrounding the platform, such as a map or model. Typically, the platform is a wheel-based vehicle or other similar vessel intended for use on land, but may also be marine or airborne. As such, the platform may also be referred to as the vehicle. However, the platform may also be a pedestrian or a user undergoing on foot motion. Further, motion sensor data, including information from accelerometers, gyroscopes, or an IMU, may also be used in conjunction with the radar measurements. Inertial sensors are self-contained sensors that use gyroscopes to measure the rate of rotation/angle, and accelerometers to measure the specific force (from which acceleration is obtained). Inertial sensors data may be used in an INS, which is a non-reference based relative positioning system. Using initial estimates of position, velocity and orientation angles of the moving platform as a starting point, the INS readings can subsequently be integrated over time and used to determine the current position, velocity and orientation angles of the platform. Typically, measurements are integrated once for gyroscopes to yield orientation angles and twice for accelerometers to yield position of the platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors as noted above. By employing radar measurements, the errors associated with motion sensor data alone can be mitigated.

The device that is contained within the platform (which as noted may be a vehicle or vessel of any type, and in some applications, may be a person,) and may have one or more sources of navigational or positional information. In some embodiments, the device is strapped or tethered in a fixed orientation with respect to the platform. The device is "strapped," "strapped down," or "tethered" to the platform when it is physically connected to the platform in a fixed manner that does not change with time during navigation, in the case of strapped devices, the relative position and orientation between the device and platform does not change with time during navigation. Notably, in strapped configurations, it is assumed that the mounting of the device to the platform is in a known orientation. Nevertheless, in some circumstances, there may be a deviation in the intended mounting orientation, leading to a misalignment between the device and the platform. In one aspect, the techniques of this disclosure may be employed to characterize and correct for such a mounting misalignment.

In other embodiments, the device is "non-strapped", or "non-tethered" when the device has some mobility relative to the platform (or within the platform), meaning that the relative position or relative orientation between the device and platform may change with time during navigation. Under these conditions, the relative orientation of the device with respect to the platform may vary, which may also be termed misalignment. As with the mounting misalignment discussed above, this varying misalignment between the frame of the device and the frame of the platform may be determined using the techniques of this disclosure and correspondingly compensated for. The device may be "non-strapped" in two scenarios: where the mobility of the device within the platform is "unconstrained", or where the mobility of the device within the platform is "constrained." One example of "unconstrained" mobility may be a person moving on foot and having a portable device such as a smartphone in their hand for texting or viewing purposes (hand may also move), at their ear, in hand and dangling/swinging, in a belt clip, in a pocket, among others, where such use cases can change with time and even each use case can have a changing orientation with respect to the user. Another example where the mobility of the device within the platform is "unconstrained" is a person in a vessel or vehicle, where the person has a portable device such as a smartphone in their hand for texting or viewing purposes (hand may also move), at their ear, in a belt clip, in a pocket, among others, where such use cases can change with time and even each use case can have a changing orientation with respect to the user. An example of "constrained" mobility may be when the user enters a vehicle and puts the portable device (such as smartphone) in a rotation-capable holder or cradle. In this example, the user may rotate the holder or cradle at any time during navigation and thus may change the orientation of the device with respect to the platform or vehicle. Thus, when non-strapped, the mobility of the device may be constrained or unconstrained within the platform and may be moved or tilted to any orientation within the platform and the techniques of this disclosure may still be applied under all of these conditions. As such, some embodiments described below include a portable, hand-held device that can be moved in space by a user and its motion, location and/or orientation in space therefore sensed. The techniques of this disclosure can work with any type of portable device as desired, including a smartphone or the other exemplary devices noted below. It will be appreciated that such devices are often carried or associated with a user and thus may benefit from providing navigation solutions using a variety of inputs. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile interne device (MID), personal navigation device (PND), digital still camera, digital video camera, binoculars, telephoto lens, portable music, video or media player, remote control, or other handheld device, or a combination of one or more of these devices. However, the techniques of this disclosure may also be applied to other types of devices that are not handheld, including devices integrated with autonomous or piloted platforms whether land-based, aerial, or underwater vehicles, including robots or Autonomous Mobile Robots (AMR), automobiles, trucks, buses, forklifts, carts, construction and/or heavy equipment such as cranes, excavators, diggers, bulldozers, or other types of vehicles or vessels, as well as equipment that may be used with such platforms. As an illustration only and without limitation, the platform may be a drone, also known as an unmanned aerial vehicle (UAV). Further, applications can also involve articulated vehicles such that odometry solutions and/or navigation solutions can be determined for the separate sections.

To help illustrate aspects of this disclosure, features of a suitable device 100 are depicted in FIG. 1 with high level schematic blocks. As will be appreciated, device 100 may be implemented as a device or apparatus, such a strapped, non-strapped, tethered, or non-tethered device as described above, which when non-strapped, the mobility of the device may be constrained or unconstrained within the platform and may be moved or tilted to any orientation within the platform. As shown, device 100 includes a processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 may include at least one sensor assembly 106 for providing motion sensor data representing motion of device 100 in space, including inertial sensors such as an accelerometer and a gyroscope, other motion sensors including a magnetometer, a pressure sensor or others may be used in addition. Depending on the configuration, sensor assembly 106 measures one or more axes of rotation and/or one or more axes of acceleration of the device. In one embodiment, sensor assembly 106 may include inertial rotational motion sensors or inertial linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by processor 102, or other processing resources of device 100, combines data from sensor assembly 106 to provide a six axis determination of motion or six degrees of freedom (6DOF) such as provided from a three-axis accelerometer and a three-axis gyroscope. Still further, sensor assembly 106 may include a magnetometer measuring along three orthogonal axes and output data to be fused with the gyroscope and accelerometer inertial sensor data to provide a nine-axis determination of motion. Likewise, sensor assembly 106 may also include a pressure sensor to provide an altitude determination that may be fused with the other sensor data to provide a ten-axis determination of motion. Other possible architectures include use of a barometer or pressure sensor being used with the gyroscope and accelerometer inertial sensor data to provide a seven-axis determination of motion. As desired, sensor assembly 106 may be implemented using Micro Electro Mechanical System (MEMS), allowing integration into a single small package.

Optionally, device 100 may implement an additional sensor assembly in the form of external sensor 108, and may represent one or more sensors as described above, such as inertial motion sensors (i.e., accelerometer and/or a gyroscope), other motion sensors or other types of sensors. For example, in some of the embodiments discussed below, external sensor 108 is a supplemental sensor, such as an optical camera, a thermal camera, an infra-red imaging sensor, a light detection and ranging (LIDAR) system, or other suitable sensor that records images or samples to help classify objects detected by the radar system. As used herein, "external" means a sensor that is not integrated with sensor assembly 106 and may be remote or local to device 100. Also alternatively or in addition, sensor assembly 106 and/or external sensor 108 may be configured to measure one or more other aspects about the environment surrounding device 100. This is optional and not required in all embodiments. For example, a pressure sensor and/or a magnetometer may be used to refine motion determinations. Although described in the context of one or more sensors being MEMS based, the techniques of this disclosure may be applied to any sensor design or implementation.

In the embodiment shown, processor 102, memory 104, sensor assembly 106 and other components of device 100 may be coupled through bus 110, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between processor 102 and memory 104.

As will be discussed in detail below, the techniques of this disclosure involve integrating radar measurements with the motion sensor data provided by sensor assembly 106 (or other sensors, such as external sensor 108) to provide the navigation solution. Device 100 obtains radar measurements 112 from any suitable radar system, which may be integrated with device 100, may be associated or connected with device 100, may be part of the platform or may be implemented in any other desired manner.

Algorithms, routines, or other instructions for processing sensor data, including detecting static objects and estimating odometry information for the platform using radar measurements 112, may be employed by odometry module 114 to perform any of the operations associated with the techniques of this disclosure. In one aspect, an integrated navigation solution based on the motion sensor data and the radar measurements may be output by odometry module 114. As used herein, a navigation solution comprises position and attitude (or orientation) and may optionally include velocity. Determining the navigation solution may involve sensor fusion or similar operations performed by the processor 102, which may be using the memory 104, or any combination of other processing resources.

Optionally, device 100 may have a source of absolute navigational information 116, such as a Global Navigation Satellite System (GNSS) receiver, including without limitation the Global Positioning System (GPS), the Global Navigation Satellite System (GLONASS), Galileo and/or BeiDou, as well as WiFi™ positioning, cellular tower positioning, Bluetooth™ positioning beacons or other similar methods when deriving a navigation solution. This is optional and not required in all embodiments. Odometry module 114 may also be configured to use information from a wireless communication protocol to provide a navigation solution determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. The source of absolute navigational information represents a "reference-based" system that depend upon external sources of information, as opposed to self-contained navigational information that is provided by self-contained and/or "non-reference based" systems within a device/platform, such as sensor assembly 106 as noted above.

In some embodiments, device 100 may include communications module 118 for any suitable purpose, including for receiving map information for the environment surrounding the platform. Communications module 118 may employ a Wireless Local Area Network (WLAN) conforming to Institute for Electrical and Electronic Engineers (IEEE) 802.11 protocols, featuring multiple transmit and receive chains to provide increased bandwidth and achieve greater throughput. For example, the 802.11ad (WiGIG™) standard includes the capability for devices to communicate in the 60 GHz frequency band over four, 2.16 GHz-wide channels, delivering data rates of up to 7 Gbps. Other standards may also involve the use of multiple channels operating in other frequency bands, such as the 5 GHz band, or other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may be used. In some embodiments, multiple communication systems may be employed to leverage different capabilities. Typically, communications involving higher bandwidths may be associated with greater power consumption, such that other channels may utilize a lower power communication protocol such as BLUETOOTH®, ZigBee®, ANT or the like. Further, a wired connection may also be employed. Generally, communication may be direct or indirect, such as through one or multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As will be appreciated, processor 102 and/or other processing resources of device 100 may be one or more microprocessors, central processing units (CPUs), or other processors which run software programs for device 100 or for other applications related to the functionality of device 100. For example, different software application programs such as menu navigation software, games, camera function control, navigation software, and phone or a wide variety of other software and functional interfaces can be provided. In some embodiments, multiple different applications can be provided on a single device 100, and in some of those embodiments, multiple applications can run simultaneously on the device 100. Multiple layers of software can be provided on a computer readable medium such as electronic memory or other storage medium such as hard disk, optical disk, flash drive, etc., for use with processor 102. For example, an operating system layer can be provided for device 100 to control and manage system resources in real time, enable functions of application software and other layers, and interface application programs with other software and functions of device 100. In some embodiments, one or more motion algorithm layers may provide motion algorithms for lower-level processing of raw sensor data provided from internal or external sensors. Further, a sensor device driver layer may provide a software interface to the hardware sensors of device 100. Some or all of these layers can be provided in memory 104 for access by processor 102 or in any other suitable architecture. Embodiments of this disclosure may feature any desired division of processing between processor 102 and other processing resources, as appropriate for the applications and/or hardware being employed. Aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as processor 102, a dedicated processor or any other processing resources of device 100.

Figure 2:
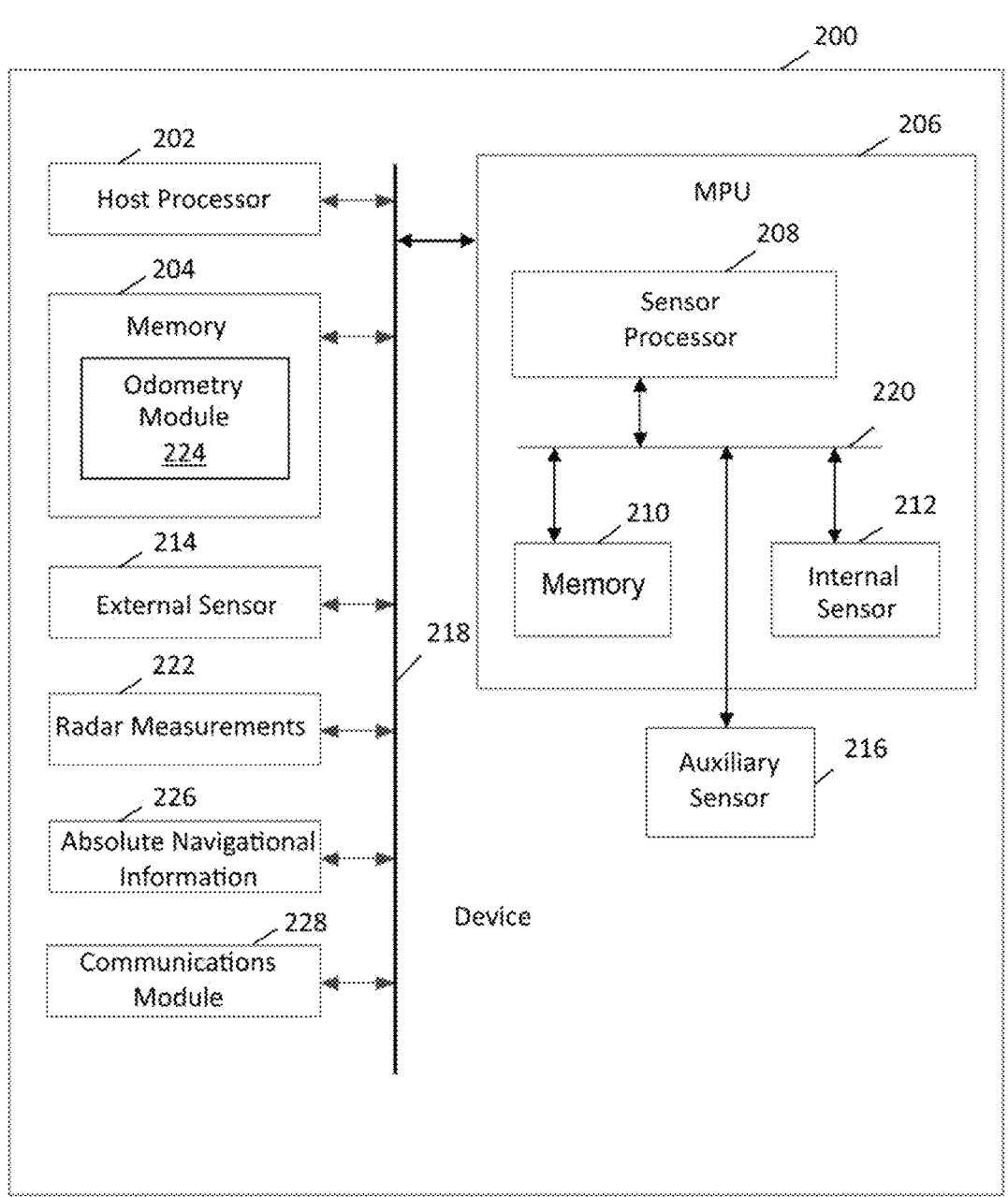
FIG. 2 is schematic diagram of another device architecture for providing an odometry solution for a device within a moving platform using a deep neural network to process radar measurements according to an embodiment.

As another illustration of aspects of this disclosure, features of a different device architecture are depicted in FIG. 2 with high level schematic blocks in the context of device 200. Here, device 200 includes a host processor 202 and memory 204 similar to the above embodiment. Device 200 includes at least one sensor assembly for providing motion sensor data, as shown here in the form of integrated motion processing unit (MPU®) 206 or any other sensor processing unit (SPU), featuring sensor processor 208, memory 210 and internal sensor 212. Memory 210 may store algorithms, routines or other instructions for processing data output by internal sensor 212 and/or other sensors as described below using logic or controllers of sensor processor 208, as well as storing raw data and/or motion data output by internal sensor 212 or other sensors. Memory 210 may also be used for any of the functions associated with memory 204. Internal sensor 212 may be one or more sensors for measuring motion of device 200 in space as described above, including inertial sensors such as an accelerometer and a gyroscope, other motion sensors including a magnetometer, a pressure sensor or others may be used in addition. Exemplary details regarding suitable configurations of host processor 202 and MPU 206 may be found in, commonly owned U.S. Pat. No. 8,250,921, issued Aug. 28, 2012, and U.S. Pat. No. 8,952, 832, issued Feb. 10, 2015, which are hereby incorporated by reference in their entirety. Suitable implementations for MPU 206 in device 200 are available from InvenSense, Inc. of San Jose, Calif.

Optionally, device 200 may implement another sensor assembly in the form of external sensor 214, and may represent sensors, such as inertial motion sensors (i.e., accelerometer and/or a gyroscope), other motion sensors or other types of sensors as described above. In this context, "external" means a sensor that is not integrated with MPU 206 and may be remote or local to device 200. Also alternatively or in addition, MPU 206 may receive data from an auxiliary sensor 216 configured to measure one or more aspects about the environment surrounding device 200. This is optional and not required in all embodiments. For example, a pressure sensor and/or a magnetometer may be used to refine motion determinations made using internal sensor 212. In the embodiment shown, host processor 202, memory 204, MPU 206 and other components of device 200 may be coupled through bus 218, while sensor processor 208, memory 210, internal sensor 212 and/or auxiliary sensor 216 may be coupled though bus 220, either of which may be any suitable bus or interface as described above.

Again, the techniques of this disclosure involve using radar to detect static objects and estimate odometry information for the platform, together with the motion sensor data provided by internal sensor 212 (or other sensors) and correspondingly, device 200 obtains radar measurements 222 from an integrated radar system. Alternatively, the radar system may be associated with device 200, may be part of the platform or may be implemented in any other desired manner. Also similar to the above embodiment, algorithms, routines or other instructions for processing sensor data, including integrating radar measurements 222, may be employed by odometry module 224 to perform any of the operations associated with the techniques of this disclosure. In one aspect, odometry information for the platform may be output by odometry module 224. Determining the odometry solution may involve sensor fusion or similar operations performed by MPU processor 208. In other embodiments, some, or all, of the processing and calculation may be performed by the host processor 202, which may be using the host memory 204, or any combination of other processing resources.

Optionally as described above, device 200 may have a source of absolute navigational information 226 and may include communications module 228 for any suitable purpose. Source of absolute navigational information 226 and/ or communications module 228 may have any of the characteristics discussed above with regard to the source of absolute navigational information 116 and communications module 118.

As with processor 102, host processor 202 and/or sensor processor 208 may be one or more microprocessors, central processing units (CPUs), or other processors which run software programs for device 200 or for other applications related to the functionality of device 200. Embodiments of this disclosure may feature any desired division of processing between host processor 202, MPU 206 and other processing resources, as appropriate for the applications and/or hardware being employed.

In the context of this disclosure, either the device or the platform also includes a radar sensor system, which provide radar measurements 112 or 222. Radars have numerous characteristics based on the signals used by the sensor, the covered area/volume by the radar, the accuracy and resolution of radar range/bearing, and the type of measurements logged by the sensor. Suitable characteristics and types of radar sensors are discussed in the following materials.

Most radar sensors radiate one of two types of RF signals; Pulse-based signal and a Frequency Modulated Continuous Wave (FMCW) signal. Pulse-based radars employ one carrier frequency denoted by $f_c$ and transmits this frequency in the form of repetitive pulses. This type of radar sensor switches between transmitting a pulse and then waiting for a short period. The radar uses the silence period to receive a reflection of the transmitted pulse (in case it is reflected by a target). By applying Fast Fourier Transform (FFT) to the repetitive pulses in the time-domain, it may be realized that the bandwidth of the signal is very large. The range and Doppler resolution of the pulse-based radar are proportional to the pulse-width and the carrier frequency of the radar respectively.

On the other hand, an FMCW signal is continuous in time and therefore, its bandwidth is limited. The FMCW signal is generated with the radar sensor by modulating the frequency at the Voltage Controlled Oscillator (VCO) linearly with time. This process is called sweeping. Moreover, the sweeping bandwidth denoted by $sw_{BD}$ is determined according to the band at which the radar operates. The sweeping time denoted by $sw_T$ is the time set for the VCO to linearly vary the frequency of the signal across $sw_{BD}$. An FMCW-based radar typically transmits and receives at the same time (simultaneous transmission and reception). Hence, the sensor does not stop transmission for it to receive a reflection from a target.

When it comes to which radar technology is better for techniques of this disclosure, each type has its advantages and disadvantages. Pulse-based radars do not require complex computations like FMCW-based radars. Moreover, there is no Doppler-range coupling like in the case of some modulation FMCW-based modulation scheme (a triangular sweep can help decouple both measurements efficiently). In addition, the accuracy of the FMCW-based radar depends on the linearity of the employed VCO. However, pulse-based radars leak power to adjacent bands, limiting the reuse of frequencies. This is a limitation of pulse-based radars because autonomous vehicles will be operating in the close vicinity, especially in urban areas. Since FMCW-based radars are continuous wave, there is no significant power leaking outside the band, therefore, frequency reuse is enabled and interference is limited. Another, drawback of pulse-based radars is that there is a transmitting time and a receiving time. In mission-critical scenarios, where the self-driving vehicle is driving at a high speed or when the vehicle is operating in dense urban environments, not being able to transmit and receive at the same time can result in high latency, which in turn, hinders real-time updates. Nevertheless, some manufacturers have commercialized pulse-based radars that provide simultaneous transmission and reception. In some embodiments, radar systems employing code division multiple access (CDMA) techniques. CDMA-based radars share similar benefits as FMCW-radars, such as with respect to minimizing power leakage, while enabling improved ranging resolution and reduced likelihood of jamming/interference from other nearby radars operating in the same frequency range.

Another important characteristic of a radar system is the frequency operating band employed. There are several millimeter frequency bands used in radar sensors. Two prominent operating bands are the 24 GHz and the 77 GHz. The 24 GHz band lies in the Industrial, Scientific and Medical radio (ISM) band. The 24 GHz-based radars operate between 24.0 GHz to 24.25 GHz, which translates to a bandwidth of 250 MHz. On the other hand, the 77 GHz band offers a wide bandwidth of up to 4 GHz. The range accuracy and resolution of the radar increases as the available sweeping bandwidth increases. The range resolution reflects the ability of the radar to detect clustered/nearby targets. Moreover, a higher operating frequency results in a higher velocity accuracy and resolution. The 77 GHz-based radars operate at a higher bandwidth (providing 20× better range accuracy and resolution) and at a higher frequency (providing 3× better velocity accuracy and resolution) compared to the 24 GHz-based radars. Finally, the dimensions of the radar antenna are proportional to the operating frequency. The antenna of the 77 GHz radar is 3 times smaller than the 24 GHz antenna.

Regardless of the type of signals used by the radar or the operating band, the radar signal processing unit estimates the range and Doppler from the received reflections. The radar range at a specific azimuth and elevation angle can be denoted by $r_{\alpha,\beta}$, where $\alpha$ is the azimuth/bearing angle relative to the radar coordinates and $\beta$ is the elevation angle. Moreover, $f_{D_{\alpha,\beta}}$ denotes the Doppler frequency of the target at range $r_{\alpha,\beta}$. Moreover, the power of the signal reflected by the target at $(\alpha, \beta)$ can be denoted by $p_{R_{\alpha,\beta}}$. Radar derived measurements; $r_{\alpha,\beta}$, $f_{D_{\alpha,\beta}}$ and direct measurement; $p_{R_{\alpha,\beta}}$ are usually used by the radar higher level processing embedded software to derive more meaningful data. This layer of adaptive algorithms (knows as Constant False Alarm Rate (CFAR)) can detect target returns against a background of noise, clutter and interference. Moreover, by grouping range, Doppler and power measurements from adjacent cells, other layers of software might be able to estimate the centroid of all targets. Another useful derived information can be the estimated size of the target (this might require the processing of several scans). All this data can be used to derive a more accurate radar measurement model. Yet another characteristic of radar measurements relates to the reflected polarity, which can be right-handed circularly polarized, left-handed circularly polarized, vertically polarized, or horizontally polarized. Polarization differences between the emitted and reflected signals may be useful for scene characterization and odometry.

Other characteristics of a radar system are its range and beam-width. Radars can be categorized based on their range and Field of View (FOV). This leads to three types of radars; Long Range Radar (LRR), Medium Range Radar (MRR) and Short-Range Radar (SRR). An LRR at the 76-77 GHz band with 600 MHz of bandwidth, usually covers a distance range of 10-250 m, a distance resolution and accuracy of 0.5 m and 0.1 m respectively, a velocity resolution and accuracy of 0.6 m/s and 0.1 m/s respectively, an angular accuracy of 0.1 degrees, a 3 dB beam-width in azimuth of +/−15 degrees and a 3 dB beam-width in elevation of +/−5 degrees. An MRR at the 77-81 GHz band with 600 MHz of bandwidth, usually covers a distance range of 1-100 m, a distance resolution and accuracy of 0.5 m and 0.1 m respectively, a velocity resolution and accuracy of 0.6 m/s and 0.1 m/s respectively, an angular accuracy of 0.5 degrees, a 3 dB beam-width in azimuth of +/−40 degrees and a 3 dB beam-width in elevation of +/−5 degrees. Finally, an SRR at the 77-81 GHz band with 4 GHz of bandwidth, usually covers a distance range of 0.15-30 m, a distance resolution and accuracy of 0.1 m and 0.02 m respectively, a velocity resolution and accuracy of 0.6 m/s and 0.1 m/s respectively, an angular accuracy of 1 degrees, a 3 dB beam-width in azimuth of +/−80 degrees and a 3 dB beam-width in elevation of +/−10 degrees.

Generally, increasing the bandwidth of the radar for the same (or close to) operating frequency can result in better range accuracy and resolution. However, a bandwidth of 4 GHz is used only in the case of SRR. Even though better range accuracy and resolution for the LRR is desirable, the distance range of the radar is proportional to the transmitted power. If higher transmitting power is used by a radar operating at a wide bandwidth, this can lead to very high out-of-band interference. Therefore, a compromise may be reached between the distance range of the radar (how far can its signal reach) and its range and accuracy. Moreover, the velocity resolution and accuracy of different types of radar are substantially equivalent because they are all operating around the same frequency band.

Finally, the Field of View (FOV) of the radar is equivalent to the beam-width in azimuth and elevation. The radars discussed so far have a wider FOV in azimuth compared to elevation, but some manufacturers are also working on 3D radars that have a wider azimuth and elevation beam-width. Moreover, some automotive radars can scan medium range and long range simultaneously.

Figure 3:
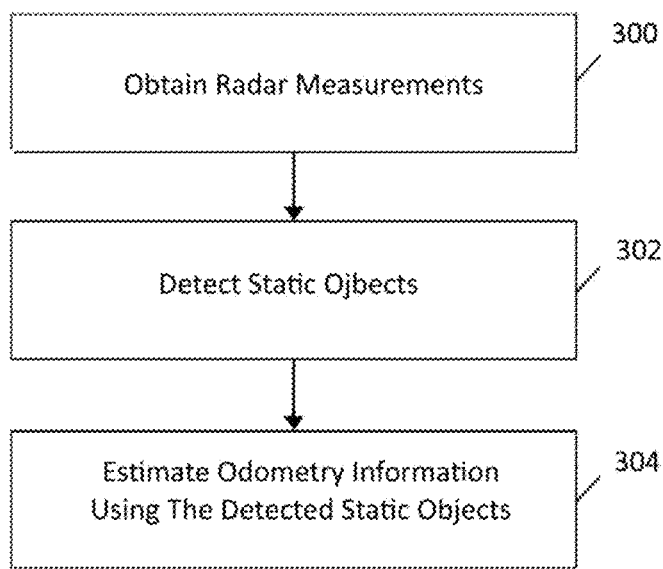
FIG. 3 is a flowchart showing a routine for providing an integrated navigation solution with radar measurements and motion sensor data according to an embodiment.

To help illustrate the techniques of this disclosure, FIG. 3 depicts an exemplary routine for using a deep neural network to provide an odometry solution for a device within a moving platform based on radar measurements. Although described in the context of device 100 as depicted in FIG. 1, other architectures, including the one shown in FIG. 2, may be used as desired with the appropriate modifications. Beginning with 300, radar measurements 112 or 222 are obtained for the platform, representing information about the environment surrounding the platform. In 302, static objects are detected based at least in part on the obtained radar measurements. Consequently, odometry information for the platform is estimated using the detected static objects in 304.

Figure 4:
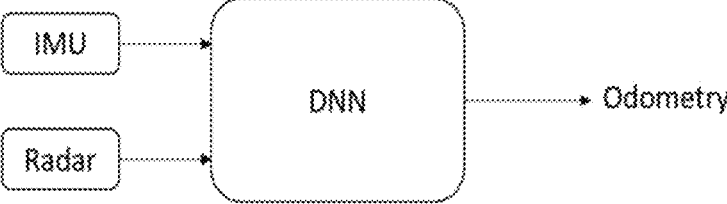
FIG. 4 is a schematic diagram showing radar measurements and motion sensor data provided as inputs to a deep neural network according to an embodiment.
Figure 5:
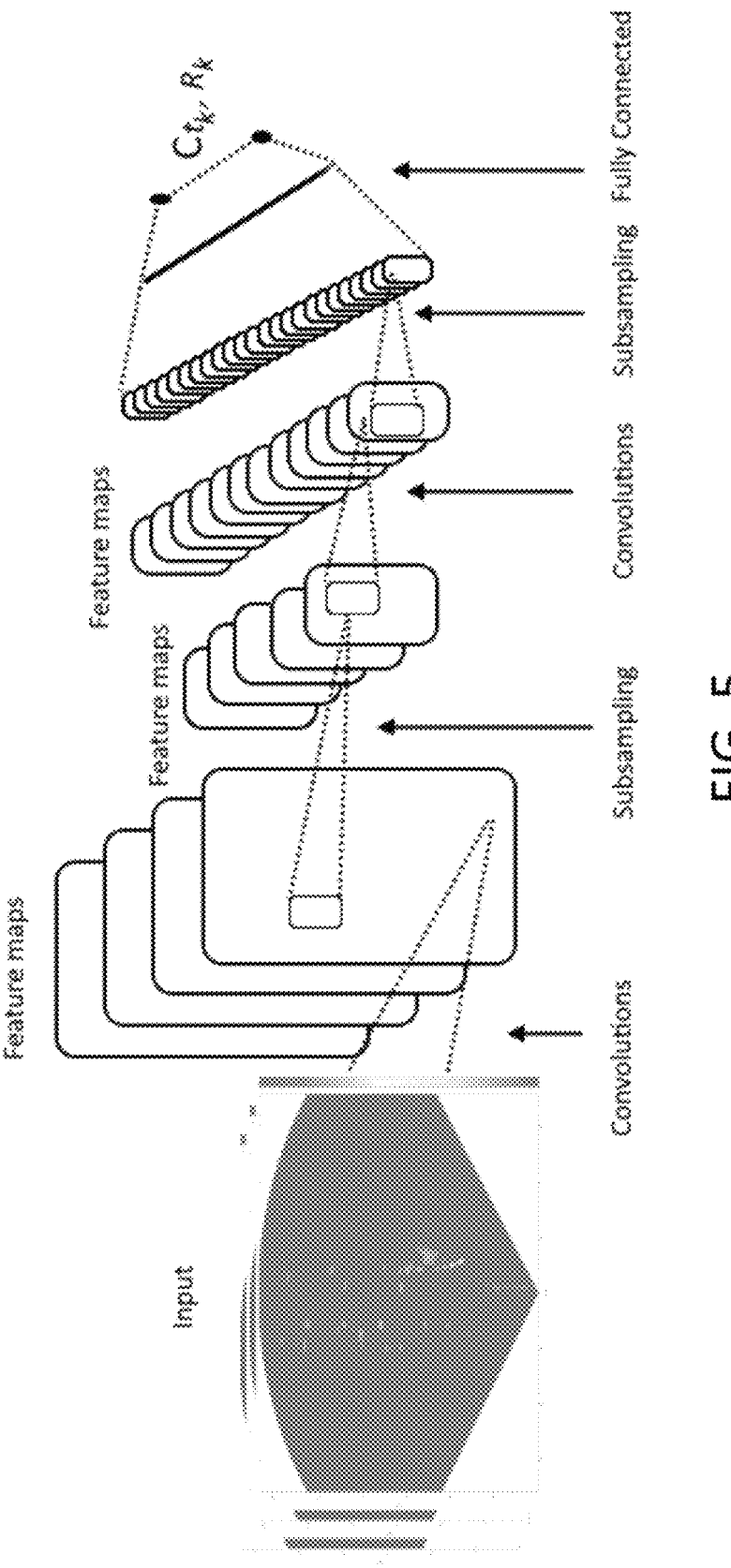
FIG. 5 is a schematic representation of a convolutional neural network suitable for providing an odometry solution for a device within a moving platform using radar measurements according to an embodiment.
Figure 6:
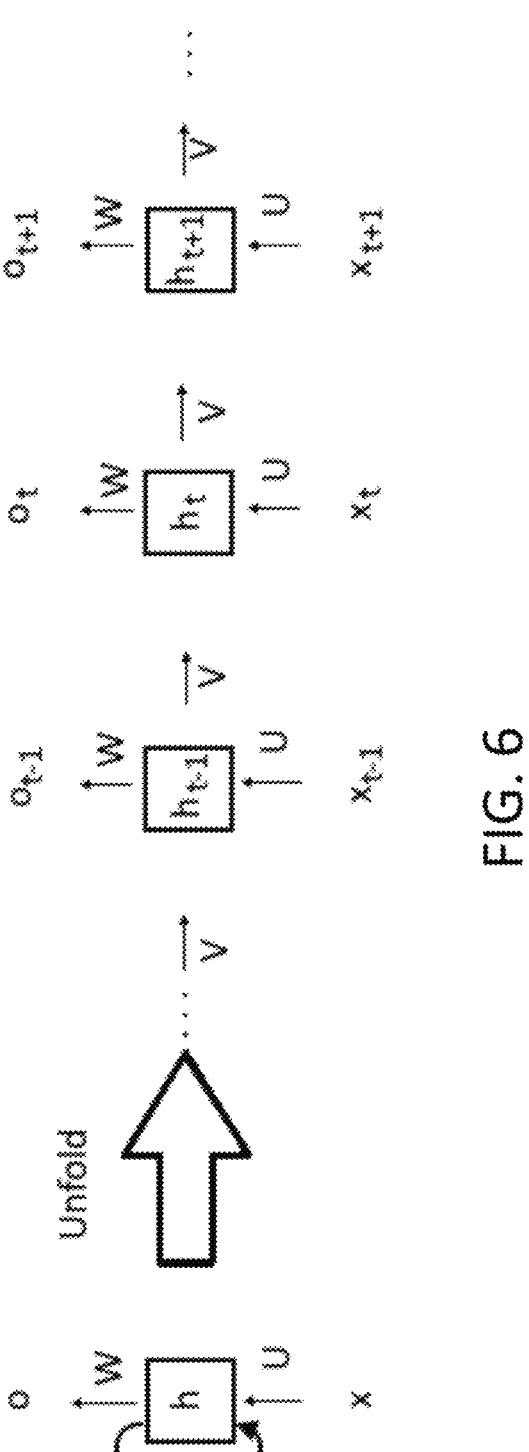
FIG. 6 is a schematic representation of a recurrent neural network suitable for providing an odometry solution for a device within a moving platform using radar measurements according to an embodiment.

As noted above, the techniques of this disclosure can benefit from the use of neural networks when processing the radar measurements. As schematically illustrated in FIG. 4, the radar measurements are supplied as input to a deep neural network which then outputs odometry information for the platform. As used herein, the term "deep neural network" refers to a neural network that has multiple layers between the input and output layers. As desired, motion sensor data for the platform can also be fed to the deep neural network to improve the odometry solution. One suitable deep neural network is a convolutional neural network (CNN) as schematically represented in FIG. 5. The alternating operations of using convolutions to produce feature maps and reducing the dimensionality of the feature maps with subsamples leads to a fully connected output that provides the classification of the object. The depth of the neural network is governed by the number of filters used in the convolution operations, such that increasing the number of filters generally increases the number of features that can be extracted from the radar measurements. Using a CNN provides beneficial shift/translation invariance characteristics. Another suitable deep neural network is a recurrent neural network (RNN) as schematically represented in FIG. 6. The left side of the figure shows the input, x, progressing through the hidden state, h, to provide the output, o. U, V, W are the weights of the network. The connections between nodes form a directed graph along a temporal sequence as indicated by the unfolded operations on the right side of the figure. An RNN has a suitable architecture for performing a time series analysis, forecast or prediction, such as a Long Short-term Memory (LSTM) implementation. Regardless of the type of deep neural network employed, parameters and weights may be learned in earlier training operations and then transferred to the network for real-time usage. For example, one or more optimization techniques may be applied to make the neural network inference more efficient for real-time usage. Further, transfer learning techniques can be applied by using another neural network developed for a similar task (such as visual odometry) and then adapted to provide a better model for the radar measurements. This can lead to better model by being faster to reach and require less training data as compared to starting form scratch. The deep neural network may be trained in a supervised approach that includes labeling the input data or in an unsupervised approach that obviates the need for labeling data but typically requires more input data.

In addition to the estimation of odometry information for the platform, it should also be appreciated that the odometry information may be further used to enhance a navigation solution for the platform, which as discussed above, can include information about the position, velocity and/or attitude of the platform. The techniques of this disclosure may be combined with any navigation solution independent of the type of the state estimation or filtering technique used in this navigation solution. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or non-linear, short memory length or long memory length) and/or automatic calibration for the errors of inertial sensors and/or the other sensors used. A state estimation technique, such as a filter, includes a prediction phase and an update phase (which may also be termed a measurement update phase). A state estimation technique also uses a system model and measurement model(s) based on what measurements are used. The system model is used in the prediction phase, and the measurement model(s) is/are used in the update phase. In some embodiments, the state estimation technique may be nonlinear so that it does not suffer from approximation or linearization and can enhance the navigation solution of the device when using very low-cost low-end inertial sensors. Still further, the radar measurements can also be directly integrated using a state estimation technique to provide the navigation solution. For example, commonly-owned U.S. patent application Ser. No. 16/420,143, filed May 22, 2019 and entitled "METHOD AND SYSTEM FOR POSITION- ING USING RADAR AND MOTION SENSORS" (TPI-055/TVS-868) provides exemplary details for directly integrating radar measurement to update a state estimation technique and is hereby incorporated by reference in its entirety. This incorporated application also discusses techniques to compensate for errors in the radar measurements.

Accordingly, the techniques of this disclosure involve a method for providing an odometry solution for a device within a moving platform using a deep neural network. Radar measurements may be obtained so that static objects are detected based at least in part on the obtained radar measurements and odometry information for the platform is estimated based at least in part on the detected static objects and the obtained radar measurements.

In one aspect, detecting static objects may include at least one of: i) classifying static objects with the deep neural network based at least in part on signal strength of the radar measurements; and ii) classifying static objects based at least in part on doppler values of the radar measurements. The radar measurements may be a stream of strength images. The deep neural network may be one of a convolutional neural network and a recurrent neural network.

In one aspect, odometry information may be estimated for the platform by at least one of: i) using the deep neural network to output the odometry information; and ii) calculating the odometry information based at least in part on relative poses of the detected static objects. The deep neural network may be trained with signal strengths for radar measurements and reference odometry information. The signal strengths for radar measurements may be a stream of strength images.

In one aspect, motion sensor data may be obtained from a sensor assembly of the device, such that estimating odometry information for the platform may be based at least in part on the obtained motion sensor data.

In one aspect, the estimated odometry information may be used to enhance a navigation solution for the platform. A source of absolute navigational information may be integrated with the navigation solution.

This disclosure also includes a system for providing an odometry solution for a device within a moving platform using a deep neural network. The system may include at least one radar configured to output radar measurements and at least one processor, coupled to receive the radar measurements and operative to detect static objects based at least in part on the radar measurements and estimate odometry information for the platform based at least in part on the detected static objects and the radar measurements.

In one aspect, the at least one processor may be operative to detect static objects by at least one of: i) classifying static objects with the deep neural network based at least in part on signal strength of the radar measurements; and ii) classifying static objects based at least in part on doppler values of the radar measurements.

In one aspect, the at least one processor may be operative to estimate odometry information for the platform by at least one of: i) using a deep neural network to output the odometry information; and ii) calculating the odometry information based at least in part on relative poses of the detected static objects.

In one aspect, the deep neural network may be one of a convolutional neural network and a recurrent neural network.

In one aspect, the system may include a device having a sensor assembly configured to output motion sensor data, wherein the at least one processor is operative to estimate odometry information for the platform based at least in part on the motion sensor data. The sensor assembly may include an accelerometer and a gyroscope. The sensor assembly may be implemented as a Micro Electro Mechanical System (MEMS).

In one aspect, the at least one processor may be further operative to enhance a navigation solution for the platform using the estimated odometry information.

In one aspect, the system may include a source of absolute navigational information.

EXAMPLES

It is contemplated that the present methods and systems may be used for any application involving providing odometry information for a platform using radar measurements. Without any limitation to the foregoing, the present disclosure is further described by way of the following materials detailing illustrative examples of using a deep neural network to provide an odometry solution.

It should be appreciated that the radar-based odometry techniques of this disclosure can work without pre-knowledge about the environment or its map or model as well as benefiting from the integration of motion sensor information. As discussed above, the motion sensor information can be fed directly to the deep neural network along with the radar measurements such as shown in FIG. 4. Notably, such techniques can give true doppler-derived velocity/speed of detected objects when the velocity/speed of the platform can be determined. Similarly, by classifying detected objects as static, such techniques get the platform velocity/speed without any other knowledge or information. Radar has advantages over other techniques used for obtaining odometry using other perception sensors such Visual Odometry (VO) or Visual inertial odometry (VIO) or Lidar odometry as radar is more robust to weather conditions (fog, rain, snow, . . . ) as well as lighting conditions as compared to these other perception sensors.

As discussed above, the obtained radar measurements are first used to detect static objects. In a first embodiment, a deep neural network can be trained to classify objects detected in the radar measurements as either static or dynamic. Notably, the identification of static objects such as buildings, signs, vegetation and roadway features provide context for determining movement and positioning of the platform within its surrounding environment. Similarly, proper discrimination of helps prevent improper inclusion of such objects during the determinations. It should also be appreciated that identification of dynamic objects can have additional utility, such as in warning and avoidance systems. Motion sensor information is deeply integrated with the radar measurements by being fed to the deep neural network as noted for use in the classification.

As noted above, one suitable deep neural network is a CNN, such as the one depicted in FIG. 5. Using a CNN provides beneficial shift/translation invariance characteristics, with the shared-weight architecture of the convolution filters that process the matrix of input features and provide feature maps of translation equivariant responses, making such networks suitable for image and video recognition. For example, learnable weights and biases are used to evaluate the importance of objects within an image to help differentiate them. Another suitable deep neural network is a RNN, such as the one depicted in FIG. 6, involving a directed graph of connections between nodes along a temporal sequence, such that information from prior inputs then can affect the current input and output. Accordingly, an RNN output depends on the prior information within the temporal sequence. Weight parameters are shared across each layer of the network and adjusted during the training phase, such as by backpropagation and/or gradient descent.

Correspondingly, the deep neural networks used in the techniques of this disclosure can receive input based on the radar measurements. For example, the radar measurements can include a strength value based on the Signal-To-Noise Ratio (SNR) of the radar measurements. In one implementation, a stream of top view SNR strength images may be provided to the deep neural network to track which objects are static versus dynamic. In other embodiments, different perspectives can be employed, including front view of strength images and/or side view of strength images. As such, a preprocessing step may be performed to draw the SNR strength images before feeding the radar measurements to the deep neural network. Alternatively or in addition, static objects may be detected using a stream of doppler values from the radar measurements. Groups of detections may be classified as static or dynamic. Other parameters in addition to doppler values can also be used. As one illustration, the polarity of the measurements (i.e. right-handed circularly polarized, left-handed circularly polarized, vertically polarized, horizontal polarized) can be a potential source of information to be used in the classification. Any suitable classifier may be used, such as random forest decision trees. During a training stage, multiple decision trees are constructed from the input information, such that in usage phase classification is based on the output of a majority of the trees. Another type of ensemble are gradient boosted decision trees, in which each tree is built sequentially and biased to correct errors from previous iterations.

Following the detection of static objects, odometry information for the platform can be estimated. For example, a deep neural network can be trained using radar measurements and reference odometry information, such as the platform velocity over the stream of SNR strength images of static object and reference odometry information. As one illustration, the reference odometry can be the three-dimensional velocity of the platform relative to static objects in its environment (ego-velocity). As discussed above, the detected static objects provide a context that may be used to assess the position or motion of the platform within its surrounding environment by comparing changes in relative size and perspective of the objects and imputing a motion for the platform consistent with the sequential observations. The trained deep neural network can then be used in real time to estimate and/or predict odometry for the platform. Alternatively or in addition, the relative pose of the detected static objects, which includes bearing, elevation and doppler or range from the radar to the objects, can be used to calculate odometry information such as ego-velocity for the platform using any suitable mathematical relationship. For example, a least squares method or machine learning regression such as random forest or gradient boosting may be used.

CONTEMPLATED EMBODIMENTS

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency are assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available) in addition to the different core use of map information discussed above, and a map matching or model matching routine. Map matching or model matching can further enhance the navigation solution during the absolute navigational information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigational information problems (degradation or absence), or they can totally replace the absolute navigational information in some applications. Another option is to use different subsets of radar measurements and or other sensors to compute an odometry and/or navigation solution and compare the solutions where certain sub-systems are excluded. If the solutions are not consistent, techniques can be used to determine which sub-system or measurements are outliers or faulty and should be excluded from the solution.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMAX. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device (s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for providing an odometry solution for a device within a moving platform using a deep neural network, the method comprising:
   a) obtaining radar measurements from at least one radar of the platform;
   b) detecting static objects based at least in part on the obtained radar measurements; and
   c) estimating odometry information for the platform based at least in part on the detected static objects and the obtained radar measurements,
   wherein at least one of step b) and c) employs the deep neural network and is based at least in part on signal strengths of the radar measurements and wherein signal strengths for the radar measurements comprise a strength image.

2. The method of claim 1, wherein detecting static objects comprises at least one of:
   i) classifying static objects with the deep neural network based at least in part on signal strength of the radar measurements; and
   ii) classifying static objects based at least in part on Doppler values of the radar measurements.

3. The method of claim 2, wherein detecting static objects comprises classifying static objects with the deep neural network based at least in part on signal strength of the radar measurements, wherein the radar measurements comprise a stream of strength images.

4. The method of claim 2, wherein detecting static objects comprises classifying static objects with the deep neural network based at least in part on signal strength of the radar measurements, wherein the deep neural network is one of a convolutional neural network and a recurrent neural network.

5. The method of claim 1, wherein estimating odometry information for the platform comprises at least one of:
   it) using the deep neural network to output the odometry information; and
   ii) calculating the odometry information based at least in part on relative poses of the detected static objects.

6. The method of claim 5, wherein estimating odometry information for the platform comprises using the deep neural network to output the odometry information and wherein the deep neural network is trained with signal strengths for radar measurements and reference odometry information.

7. The method of claim 6, wherein the signal strengths for radar measurements comprise a strength image.

8. The method of claim 1, 2 or 5, further comprising obtaining motion sensor data from a sensor assembly of the device, wherein the estimation of odometry information for the platform is based at least in part on the obtained motion sensor data.

9. The method of claim 1, wherein the estimated odometry information is used to enhance a navigation solution for the platform.

10. The method of claim 1 or 9, further comprising integrating a source of absolute navigational information.

11. A system for providing an odometry solution for a device within a moving platform using a deep neural network, comprising at least one radar of the platform configured to output radar measurements and at least one processor, coupled to receive the radar measurements and operative to:
   i) detect static objects based at least in part on the radar measurements; and
   ii) estimate odometry information for the platform based at least in part on the detected static objects and the radar measurements,
   wherein at least one of i) and ii) employs the deep neural network and is based at least in part on signal strengths of the radar measurements and wherein signal strengths for the radar measurements comprise a strength image.

12. The system of claim 11, wherein the at least one processor is operative to detect static objects by at least one of:
   i) classifying static objects with the deep neural network based at least in part on signal strength of the radar measurements; and
   ii) classifying static objects based at least in part on Doppler values of the radar measurements.

13. The system of claim 11, wherein the at least one processor is operative to estimate odometry information for the platform by at least one of:
   i) using the deep neural network to output the odometry information; and
   ii) calculating the odometry information based at least in part on relative poses of the detected static objects.

14. The system of claim 11, wherein the deep neural network is one of a convolutional neural network and a recurrent neural network.

15. The system of claim 11, 12 or 13, further comprising a device having a sensor assembly configured to output motion sensor data, wherein the at least one processor is operative to estimate odometry information for the platform based at least in part on the motion sensor data.

16. The system of claim 15, wherein the sensor assembly includes an accelerometer and a gyroscope.

17. The system of claim 16, wherein the sensor assembly is implemented as a Micro Electro Mechanical System (MEMS).

18. The system of claim 11, wherein the at least one processor is further operative to enhance a navigation solution for the platform using the estimated odometry information.

19. The system of claim 11 or 18, further comprising a source of absolute navigational information.

* * * * *